(12) United States Patent
Diggins et al.

(10) Patent No.: US 8,003,022 B2
(45) Date of Patent: Aug. 23, 2011

(54) METHOD OF FORMING A COATED OPTICAL ELEMENT

(75) Inventors: David Robert Diggins, Flagstaff Hill (AU); David Andrew Lewis, Marion (AU)

(73) Assignee: Carl Zeiss Vision Australia Holdings Limited, Lonsdale (AU)

( * ) Notice: Subject to any disclaimer, the term of this patent is extended or adjusted under 35 U.S.C. 154(b) by 65 days.

(21) Appl. No.: 12/020,101

(22) Filed: Jan. 25, 2008

(65) Prior Publication Data

US 2009/0026638 A1    Jan. 29, 2009

Related U.S. Application Data

(63) Continuation-in-part of application No. 10/089,470, filed as application No. PCT/AU00/01152 on Sep. 21, 2000, now abandoned.

(30) Foreign Application Priority Data

Sep. 21, 1999 (AU) ...................................... PQ3263

(51) Int. Cl.
*B29D 11/00* (2006.01)
(52) U.S. Cl. ............ 264/1.7; 264/2.3; 264/2.5; 264/338
(58) Field of Classification Search ................... 264/1.7, 264/2.3, 2.5, 338, 17
See application file for complete search history.

(56) References Cited

U.S. PATENT DOCUMENTS

| | | | |
|---|---|---|---|
| 4,273,809 A | 6/1981 | LaLiberte et al. | |
| 4,774,035 A | 9/1988 | Carmelite et al. | |
| 5,096,626 A * | 3/1992 | Takamizawa et al. | 264/1.7 |
| 5,204,126 A * | 4/1993 | Singh et al. | 425/412 |
| 5,462,806 A * | 10/1995 | Konishi et al. | 428/451 |
| 5,667,735 A | 9/1997 | Bae et al. | |
| 5,693,366 A | 12/1997 | Mase et al. | |
| 5,733,483 A | 3/1998 | Soane et al. | |
| 6,000,814 A * | 12/1999 | Nestell et al. | 362/267 |

FOREIGN PATENT DOCUMENTS

| | | |
|---|---|---|
| EP | 102847 A1 | 3/1984 |
| EP | 102847 B1 | 7/1989 |
| JP | 62231712 | 10/1987 |
| JP | 01004312 | 9/1989 |

OTHER PUBLICATIONS

Seymour et al., An Introduction to Polymer Chemistry, Third Edition, pp. 340-342 and p. 630, 1994.
Ophthalmic Optics Files, "Coatings", Essilor International, Apr. 1997, pp. 1-3, 33-35.

* cited by examiner

*Primary Examiner* — Christina Johnson
*Assistant Examiner* — Larry Thrower
(74) *Attorney, Agent, or Firm* — Buchanan Ingersoll & Rooney PC

(57) ABSTRACT

A method of forming a coated optical element is disclosed herein. The method uses a mold having first and second mold sections that will form front and back surfaces of the optical element, one of the mold sections having a casting face. The method includes the steps of: applying an abrasion resistant coating layer to the casting face of a mold section, the casting face being capable of imparting a desired optical configuration on a surface of the optical element; treating the abrasion resistant coating layer to prevent damage to the layer during subsequent steps; applying a second coating layer to the abrasion resistant coating layer to substantially cover the abrasion resistant coating layer; treating the second coating layer to provide at least weak adhesion of the second coating layer to the abrasion resistant coating layer and to prevent damage to the second layer during subsequent steps; filling the mold with an organic liquid material; and hardening the organic liquid material so as to form the optical element adhered to the second coating layer.

42 Claims, No Drawings

METHOD OF FORMING A COATED OPTICAL ELEMENT

CROSS-REFERENCES TO RELATED APPLICATIONS

This application is a continuation-in-part of U.S. application Ser. No. 10/089,470, filed Mar. 20, 2002, pending, which is a 371 application of PCT/AU00/01152 filed on Sep. 21, 2000, which claims priority from Australian Patent Application No. PQ 3263 filed on Sep. 21, 1999, the entire content of which are hereby incorporated by reference.

FIELD OF THE INVENTION

The present invention relates to a method of forming a coated optical element. The invention finds particular use where the optical element is an ophthalmic lens, and in particular relates to a method of forming a coated ophthalmic lens by utilising improved in-mould coating techniques.

BACKGROUND OF THE INVENTION

The application of coatings to surfaces has been achieved in a variety of ways, such as by spin coating, dip coating, spray coating, and flow coating techniques. While these techniques have been successful when used to coat smooth surfaces, such as the optical surface of single vision ophthalmic lenses, they have not been entirely satisfactory. For example, such techniques have often resulted in a build-up of a coating material at the outer edge of the lens that causes optical aberrations.

Such techniques have proven to be even less satisfactory when used to coat irregular surfaces, such as those present on multi-vision ophthalmic lenses, particularly those made from plastic. Such lenses generally have segments that project abruptly away from at least one major optical surface of the lens. Coating solutions applied to these optical surfaces by spin, dip, spray, or flow techniques must flow around and over these segments, with the resulting coating generally exhibiting flow marks around the projection and being thick at the intersections of the segment and the optical surface.

A further disadvantage of conventional techniques of applying coatings to optical elements is that they often have high labour and capital requirements. Furthermore, any yield loss at the point of coating results in total loss of a high valued product at the end of its manufacturing cycle.

In response to these difficulties, an 'in-mould' coating technique was developed for manufacturing ophthalmic lenses. The method comprised applying a single coating to a face of a mould, partially curing the coating upon the mould, subsequently assembling the moulds, filling the moulds with a lens monomer, and curing the lens monomer to form a hard lens.

However, a limitation of this in-mould technique is that it does not allow for the provision of a coating that is both highly abrasion resistant and has excellent cross hatch adhesion to the lens substrate. Furthermore, it has not proven to be possible to incorporate other desirable optical properties to the coating produced by this technique.

It is an aim of the present invention to provide an improved in-mould coating technique that is capable of being used to produce coated optical elements such as ophthalmic lenses.

SUMMARY OF THE INVENTION

The present invention provides a method of forming a coated optical element, the method using a mould having first and second mould sections that form front and back surfaces of the optical element, one of the mould sections having a casting face, the method including the steps of:

applying an abrasion resistant coating layer to the casting face of a mould section, the casting face being capable of imparting a desired optical configuration on a surface of the optical element;

treating the abrasion resistant coating layer to prevent damage to the layer during subsequent steps;

applying a second coating layer to the abrasion resistant coating layer to substantially cover the abrasion resistant coating layer;

treating the second coating layer to provide at least weak adhesion of the second coating layer to the abrasion resistant coating layer and to prevent damage to the second layer during subsequent steps;

filling the mould with an organic liquid material; and hardening the organic liquid material so as to form the optical element adhered to the second coating layer.

The method of the present invention may be used to coat the first mould section, the second mould section, or both mould sections. Thus, the in-mould coating method of the invention is particularly useful for the formation of both finished and semi-finished ophthalmic lenses.

In one form of the present invention, the abrasion resistant coating layer is applied to the casting face of a mould section so as to completely cover the casting face. However, it should be appreciated that there may be manufacturing constraints that cause the covering not to be perfectly complete over all of the casting face, which may be acceptable in some circumstances, especially if the optical element is not to be tinted, the defects are very small or are at the periphery of the element (in the case of an ophthalmic lens, outside the normal region for vision), or if the optical element is to be subsequently given an anti-reflection coating using vacuum coating techniques. Therefore, it will be appreciated that the covering of the casting face need only be substantially complete. Indeed, this may also be the case for the covering of the abrasion resistant coating layer by the second coating layer.

Also, it is to be appreciated that the method may include the coating of further layers onto the casting face of the mould section prior to application of the abrasion resistant coating layer to the casting face; there thus possibly being third, fourth, fifth (or more) coating layers, each similarly applied over the previous coating layer and each similarly treated to prevent damage during subsequent steps in the method. Further, after a coated optical element has been formed in accordance with the present invention, subsequent coatings may be applied via conventional means, such as by normal spin, dip or vacuum applications. For example, a highly abrasion resistant, multilayer, coated optical element (formed in accordance with the method of the present invention) may be subsequently coated with a traditional multilayer anti-reflection coating stack via conventional technology.

Throughout this specification, reference to the treatment of a coating layer to prevent damage during subsequent method steps is to be understood to relate to the provision of a degree of mechanical and chemical robustness to the layer; for example, so as to prevent crazing, delamination or removal of the layer, or so as to prevent redissolution of the layer by subsequently applied layers, or so as to prevent some other type of physical damage thereto during the coating processes used for subsequent layers. Thus, the term 'damage' is to be interpreted broadly so as to encompass any subsequent physical or chemical alteration to a layer that is considered undesirable.

It is envisaged that such a treatment will generally either be a partial curing of the layer, a solvent removal step, or both as will be explained below. In any form, the treatment of each coating layer is preferably conducted to a degree wherein the coating layer forms a substantially insoluble dry film that exactly replicates the casting face of the mould in a substantially aberration-free manner. More particularly, the coating layer will generally not flow by itself, although touching the coating layer with finger pressure may deform it and it may be tacky to the touch.

Whichever technique is employed, it is preferred that the coating layer be prepared in a predetermined fashion according to the chemistry of the subsequent layers. For example, if a coating layer is under-cured, it may produce a hazy film, subsequent coatings or the organic material may redissolve it, or it may exhibit poor abrasion resistance. However, if a coating layer is over-cured, it may exhibit unacceptable adhesion.

With specific reference to the treatment being an at least partial cure employing thermal techniques, it has been found that a coating layer can be successfully partially cured by exposing it to a temperature in the range of 35° C. to 130° C. for a duration in the range of one to thirty minutes. Indeed, if a coating layer contains an unsaturated monomer, such as an acrylate, the coating layer may be cured until it exhibits a degree of unsaturation of about 30% to 90% of the unsaturation it possessed prior to curing. Ideally, this may be achieved through the use of thermal energy initiating a thermal initiator. Alternatively, partial cure can be effected by activating radiation such as ultraviolet light (with an appropriate initiator in the coating material) or by electron beam radiation.

In this respect, coatings that have a degree of unsaturation above 90% have been found to provide a hazy film or are dissolved by subsequent layers or organic material (i.e., one which is not optically clear) on the final optical element and may also exhibit poor abrasion resistance. However, those that have a degree of unsaturation below about 30% generally exhibit unacceptable adhesion to the final optical element. More preferably, though, such a coating layer will be cured until it exhibits a degree of unsaturation in the range of 40% to 75%, and most preferably from 55% to 70%, of the unsaturation it possessed prior to reaction.

In relation to the partial curing of a coating layer, techniques suitable for curing the coatings will be obvious to those skilled in the art, and the specific technique used to ensure at least partial curing will ideally be selected to suit the type of coating material. For example, when polysiloxane coatings are used, containing partially hydrolysed and partially condensed glycidoxypropyltrimethoxysilane, methyltrimethoxysilane, methacryloxypropyltrimethoxysilane, allyltrimethoxysilane, vinyltrimethoxysilane, other organosilanes or other functionalised organosilanes, there is the option of either further advancing the condensation to provide a gelled network, or polymerising through the organic component of the coating layer. In this respect, network formation via the organic component can be effected, for example, by ring opening the glycidoxy portion of the glycidoxypropyltrimethoxysilane using cationic initiators or curing catalysts, curing the ethylenic portion of the methacryloxypropyltrimethoxysilane, vinyltrimethoxysilane or allytrimethoxysilane, or by using cationic or free radical initiators.

Alternatively, and as mentioned above, the treatment to prevent damage during subsequent steps may be a solvent removal treatment. Solvent removal may be achieved by air drying or by the use of infra-red radiation, microwave radiation or heat. Such a solvent removal treatment is envisaged to be preferred in circumstances where a coating material is itself already partially cured and is dispersed or dissolved in a solvent. An example of such a system is a high molecular weight polysiloxane that is dispersed in a solvent and requires very little, if any, additional cure. If solvent is not removed from an applied coating layer, the film may be redissolved by a subsequent coating layer or by the organic material, it may not form a sufficiently mechanically robust film, or it may not be impervious to the diffusion of solvent from a subsequent coating layer. Indeed, solvent diffusion into the abrasion resistant coating layer may lead to swelling followed by stress cracking, which is clearly undesirable. Alternatively, solvent diffusion may lead to the delamination of the weakly adhered abrasion resistant layer.

Alternatively, a combination of solvent removal and a partial cure may be necessary to form a film that is sufficiently mechanically robust. Furthermore, it will also be appreciated that in order to eliminate some of the difficulties associated with the presence of a solvent in coating material, a solventless coating material can be utilised.

Finally in relation to the treatment of the abrasion resistant coating layer, the second coating layer, and any further coating layers (third, fourth, fifth etc. coating layers) it will be appreciated that such a treatment also serves to provide suitable adhesion of the abrasion resistant coating layer to the casting surface, of the second coating layer to the abrasion resistant coating layer, of the second coating layer to the lens substrate, of the third coating layer (if present) to the abrasion resistant coating layer, etc. Indeed, in order to achieve a sufficiently mechanically robust coating it is preferable to have sufficient adhesion between coating layers. In this respect, sufficient adhesion may be achieved by partial diffusion of one coating into another resulting in mechanical interlocking between coating layers, by physical bonding, or by coreaction of the coating layers at the interface.

Partial curing of the film may not only promote a mechanically robust film but may also promote coreaction, and therefore adhesion, between films. In some cases, the adhesion of the abrasion resistant coating layer (or any of the third, fourth, fifth, etc layers) to the mould needs to be controlled. If adhesion of the coating layer that is directly on the mould is too strong, the optical element on opening of the mould may pull glass material from the mould. Alternatively, if the adhesion of the coating layer that is directly on the mould to the mould is not strong enough, separations may result which may lead to unacceptable surface quality and hence an unacceptable optical element. With this in mind, adhesion of coating layers to moulds can be affected by a variety of techniques, such as surface modification of the mould surface, such modification being in the form of a silane treatment or a fluorochemical treatment or the like. Alternatively, mould adhesion to a coating layer can be affected by the addition of mould release agents or adhesion promoters to the coating resin.

The method of the present invention may further include an additional thermal post-cure cycle after the hardening of the organic liquid material, and after the optical element is removed from the mould. Such a post-cure cycle assists in ensuring that the final optical element has optimal properties. Properties that may be further improved by an additional post-cure step includes hardness, abrasion resistance, tint rate, thermo-mechanical properties, and the level of optical strain resulting from residual stress.

Such an additional post-cure cycle may be accomplished by the same techniques utilised to initially partially cure the coating layers. In this respect, the conditions employed during post-curing will typically be sufficient to ensure essentially complete curing of the coating layers. It will be appreciated that a post-curing step will be most important in systems such as polysiloxane systems, in which heating to 90 to 120° C. for a period of up to 4 hours is desirable to substantially fully condense the polysiloxane coating layers and develop optimal mechanical properties.

The method of the present invention is thus capable of producing an optical element, such as an ophthalmic lens, having a thin, optically clear, multi-layer coating (such as an abrasion resistant coating), on one or more of its optical surfaces.

The coating layers applied by the method of the present invention will be substantially free from surface aberrations that may arise due to non-uniformity of the thickness of the coating solution, flow marks, coating build-up (particularly at the segment lines and edges of ophthalmic lenses), and crazing of intermediate layers. Additionally, the coating layers preferably substantially exactly replicate the mould surfaces from which an ophthalmic lens is made and consequently provide an optical surface having the desired surface configuration.

Further still, the method provides a technique that is equally useful in applying a multilayer coating to single, multifocal or progressive ophthalmic lenses, and that achieves a high yielding, cost efficient, manufacturing process for producing premium quality ophthalmic lenses.

In addition to abrasion resistance, the method of the present invention may also be utilised to provide for the incorporation of special features into a multilayer coating, such as antireflection, mirror coatings, impact enhancement, photochromic dye incorporation, electrochromic incorporation, and tint incorporation.

Specifically, some of these features can be included in a layer specifically tailored for that feature. For example, a rubbery intermediate layer between a hard coat and a substrate may serve as an impact enhancing layer. Similarly, an intermediate layer may be designed specifically to incorporate tints or photochromic dyes. Alternatively, an electrochromic system may be more easily applied to a mould surface first, where high temperatures (up to 400° C. to anneal some layers) may be present, rather than subjecting the substrate to such operations.

Further still, one form of the present invention results in the formation of an optical element (such as an ophthalmic lens) where the abrasion resistant coating layer is formed from a polysiloxane coating resin and the second coating layer is an intermediate layer. In this form, the intermediate layer has the ability to co-react with both the abrasion resistant polysiloxane resin and with the preferred type of organic material, namely the lens monomer. In this respect, when a standard polysiloxane hard coat resin is used, methacryloxypropyltrimethoxysilane (or some other (meth)acryl silane) is preferably present in the intermediate layer so that the silane part thereof can co-condense with the polysiloxane resin of the hard coat and the methacryl part thereof can co-react with the unsaturated ethylene groups of the lens monomer. An amount of methacryloxypropyltrimethoxysilane in the broad range of 30% to 100% (by weight) may be used, although an amount in the range 50% to 90% is more preferred.

Another form of the present invention results in the formation of an optical element (such as an ophthalmic lens) where the second coating layer is an impact resistant primer coating. The impact resistant primer coating can be any coating typically used for improving impact resistance of a finished optical element. The impact resistant primer coating preferably also enhances adhesion of the abrasion resistant coating on the finished optical element. By way of example, the impact resistant primer coating may be a (meth)acrylic based coating or a polyurethane based coating. In particular, the impact resistant primer coating can be made from a latex composition such as a poly(meth)acrylic resin, a polyurethane resin or a polyester resin.

Furthermore, there are significant process advantages if an antireflection coating stack were to be applied in conjunction with an abrasion resistant layer to a mould rather than having separate processes to apply the abrasion resistant layer and the antireflection coat.

As used throughout this specification, the following terms have the following meanings:

a) "Optically clear" means free from haze or other interference that prevents an object on one side of a lens from being seen clearly by an observer on the other side of a lens;

b) "Aberration-free" means that an object on one side of a layer of the coated lens does not appear to be bent, twisted or distorted to a viewer on the other side of the lens;

c) "Optical surface" means one of the surfaces which provides optical correction;

d) "Lens substrate" means an organic liquid which when cured forms a solid at room temperature and provides optical properties consistent with those required for an ophthalmic lens;

e) "Optical element" includes lenses for optical devices such as cameras, microscopes, telescopes, or for the refracting or reflecting of light (eg mirrors) in any scientific or medical device, and of course also includes ophthalmic lenses of all types, whether they be refractive or piano.

f) Reference to application of a coating layer to a mould section or another coating layer does not mean that the material applied necessarily has the designated properties; the properties may only be conferred on the coating after it has been cured. For example, reference to application of an abrasion resistant coating layer does not mean that the material applied is abrasion resistant. Rather, after curing the material is abrasion resistant.

g) Reference to application of a coating layer to a casting face of a mould section does not mean that the material is applied directly onto the mould section and there may be other layers (such as further coating layers) or materials on the casting face.

DETAILED DESCRIPTION OF THE INVENTION

Reference will now be made to several specific aspects of preferred embodiments of, and possible alternatives to, the method of the present invention.

In the method of the present invention, each coating layer applied will ideally be thin, although the actual thickness generally will depend on the function of the particular layer. For instance, the abrasion resistant coating layer will typically have a thickness in the range of 0.5 to 50 µm, although more preferably in the range of 0.8 to 10 µm, but most preferably in the range of 1 to 5 µm thick.

If one or more of the further coating layers is to act as a permanent mould release agent to facilitate the removal of the lens from the mould, or as a hydrophobic or oleophobic layer, it will preferably be very thin. In this form, the further coating layer will preferably have a thickness in the range of 1 nm to 1 µm, although more preferably in the range of 1 nm to 100 nm, but most preferably in the range of 1 nm to 30 nm.

If the second coating layer is intended to act as an adhesion promoter between the abrasion resistant coating layer and the lens substrate, the second coating layer will preferably also be thin, with a typical thickness being in the range of 0.05 to 50 µm, more preferably in the range of 0.01 to 10 µm, but most preferably in the range of 0.2 to 1 µm.

In addition to a second coating layer providing a benefit in adhesion between a lens substrate and an abrasion resistant coating layer and/or impact resistance it can also serve other functions. These other functions may be such as:

(i) the incorporation of dyes to provide a tint for the final product;

(ii) the incorporation of a photochromic dye to provide a light sensitive variable transmission;

(iii) the incorporation of an electrochromic system which upon the application of a current will change colours and vary the transmission; and (iv) the incorporation of a liquid crystal material, which upon the application of an electric field will orient in accordance with the applied electric field and provide variable transmission of a particular polarisation of light.

Alternatively, these product enhancing features may be separately (or in combination) incorporated into third, fourth (and so on) further coating layers (i.e. the layers between the abrasion resistant coating and the casting face of the mould section), rather than be incorporated into the second coating layer.

In an alternative form, if the method of the present invention is to be used to produce, for instance, an ophthalmic lens carrying a hydrophobic/oleophobic abrasion resistant, anti-reflection multilayer stack, the initial coating layer deposited on the casting face of the mould section will preferably be very thin and act as a mould release/hydrophobic layer. A series of layers, comprised of multiple layers of metal oxides (known in the art as an anti-reflection stack) may then form a series of middle coating layers. This series of middle coating layers may cumulatively have a thickness in the range of 0.5 to 20 µm, more preferably in the range of 1 to 10 µm, but most preferably in the range of 1.5 to 5 µm. Such an anti-reflection stack may be a standard multi-layer anti-reflective coating, and the number and/or thickness of the layers therein may be selected utilising suitable computer software.

The layers in such an anti-reflection stack may include alternate high and low refractive index layers. Such low and high refractive index layers may be formed from any suitable material. The low and high refractive index layers may be formed of a dielectric material. Preferably, the dielectric layers will be formed from metal oxides, fluorides or nitrides. Metal oxides that may be used for forming transparent layers include one or more of SiO, $SiO_2$, $ZrO_2$, $Al_2O_3$, TiO, $TiO_2$, $Ti_2O_3$, $Y_2O_3$, $Yb_2$, $O_3$, MgO, $Pr_2O_3$, $Ta_2O_5$, $CeO_2$, and $HfO_2$. Fluorides that may be used include one or more of $MgF_2$, $AlF_3$, $BaF_2$, $CaF_2$, $Na_3AlF_6$, $Ta_2O_5$, and $Na_5Al_3Fl_{14}$. Suitable nitrides include $Si_3N_4$ and AlN.

It should be appreciated that by utilising the techniques of the present invention, interference rings which arise from a mismatch of the refractive index of the coating layers or between the coating layers and the substrate can be minimised, enabling the use of refractive index mismatched coatings. However, there will generally be a desire to match the refractive indices of each coating layer and the lens substrate as closely as possible to minimise the potential for interference rings.

In this respect, and in order to modify the refractive index of a coating layer without changing the chemistry of the coating formulation, very small particulate fillers can be added. Titanium dioxide, silicon dioxide or layers of silicon dioxide on titanium dioxide, tin oxide, etc have been used for this purpose. The average particle size will preferably be between 10 nm and 80 nm diameter, although will preferably be between 20 nm and 50 nm.

To ensure that these particles are substantially uniformly distributed throughout the coating layer and not agglomerated, a combination of surface treatment of the particles, grafting of a compatible monomer onto the surface of the particle, and/or use of surfactants or levelling agents may be used. The loading of these particles is dependent on the refractive index of the coating matrix material, the refractive index of the particulate filler and the refractive index desired, but typically is in the range of 5% to 50% by weight of the final coating.

Particles can be added to all layers, including an abrasion resistant coating and a primer coating in order to achieve the desired refractive index. By utilising these particles, a refractive index matched, low haze coating can be achieved for a range of chemistries. Indeed, these particles may also be added specifically in order to increase the abrasion resistance of a coating layer.

In general terms, examples of materials able to be used to formulate the various coating layers that may be applied in the method of the present invention are materials that have a reactive ethylenically unsaturated group, such as acrylates, methacrylates, acrylic anhydrides, ethylenically unsaturated anhydrides, olefinic compounds, acrylamides, ethylenically unsaturated amides and urethanes, vinyl esters, vinyl ethers, vinyl halides, vinyl epoxy resins, vinyl silanes and siloxanes, vinyl heterocycles, and prepolymers and polymers of these materials. These materials may be mono- or polyfunctional.

Additionally, non free radical reacting systems such as melamines, anhydrides and amine cured epoxy resins, maleimides and polymides can also be used to formulate various coating layers.

Further examples of materials able to be used to formulate a coating layer include organosilanes and organosiloxanes. Such materials include vinyl silanes, allyl silanes and (meth) acryl silanes. Other organosilanes and organosiloxanes include tetraalkoxyorthosilicates, alkyltrialkyloxysilanes, dialkyldialkyloxysilanes, mercaptosilanes, isocyanatosilanes, etc. Also included are oligomeric materials based upon the aforementioned organosilane and organosiloxane species.

In addition to silicon based oxides for the abrasion resistant coat, other metal oxides can also be used. Materials such as tetramethoxytitanate and other metal oxides based on cerium, tin, zirconium, etc. and their derivatives can be used as monomers or can be prereacted in a similar manner to the functional silanes to form a prepolymer coating with similar coating properties to other commercial polysiloxanes. These materials provide advantages over polysiloxanes in that they provide a higher refractive index and therefore are suitable for producing index matched coatings for higher index substrate materials such as Finalite and Spectralite (registered trademarks of Sola International Inc) or a variety of commercial thiourethane ophthalmic lens materials.

Further examples of materials able to be used to formulate a coating layer include urethanes. For example, these materials may be based on a polymeric polyol and an organic polyisocyanate. Examples of polymeric polyols are polyether polyols, polyester polyols, acrylic polyols and mixtures of such polyols. Examples of organic polyisocyanates are monomeric polyisocyanates and polymeric isocyanates. These materials may be suitable for the formation of an impact resistant second coating layer.

Further examples of materials able to be used to formulate a coating layer include thiols. These materials may be mono- or polyfunctional and often used in conjunction with materials containing ethylenically unsaturated bonds or epoxides.

Further examples of materials able to be used to formulate a coating layer are various commercial compositions based upon the aforementioned monomeric components. Specific examples of such materials include: SDC 1154, Silvue 339, PPG 1080, Suminal G35, GE 8556 and GE 8553 and GE 8566, etc.

If a reaction initiator is used in any particular coating layer, the nature of such a reaction initiator will generally be dependent upon the ethylenically unsaturated material used. For example, for those ethylenically unsaturated materials that undergo free radical polymerisation, suitable initiators are compounds that liberate or generate a free-radical on addition of energy. Such initiators include peroxy, azo, and redox systems each of which are well known and are described in polymerisation art.

Included among the free-radical initiators are the conventional heat activated catalysts such as organic peroxides and organic hydroperoxides. Examples of these catalysts are benzoyl peroxide, tertiary-butyl perbenzoate, cumene hydroperoxide, azobis(isobutyronitrile) and the like.

The preferred catalysts are photopolymerisation initiators. Included among such initiators are acyloin and derivatives thereof, such as benzoin, benzoin methyl ether, benzoin ethyl ether, benzoin isopropyl ether, benzoin isobutyl ether, and .alpha.-methylbenzoin; diketones such as benzil and diacetyl, etc.; organic sulfides such as diphenyl monosulfide, diphenyl disulfide, decyl phenyl sulfide, and tetramethylthiuram monosulfide; S-acyl dithiocarbamates, such as S-benzoyl-N,N-dimethyldithiocarbmate; phenones such as acetophenone, .alpha.,.alpha.,.alpha.-tribromacetophenone,.alpha.,.alpha.-diethoxyacetophenone, .alpha.,.alpha.-dimethoxy-.alpha.-phenylacetophenone, o-nitro-.alpha.,.alpha.,.alpha.-tribromacetophenone, benzophenone, and p,p'-bis(dimethyliamino)benzophenone; aromatic iodonium and aromatic sulfonium salts, sulfonyl halides such as p-toluenesulfonyl chloride, 1-naphthalenesulfonyl chloride, 2-naphthalenesulfonyl chloride, 1,3-benzenedisulfonyl chloride, 2,4-dinitrobenzenesulfonyl bromide, and p-acetamidobenzenesulfonyl chloride.

The reaction catalysts employed with silane and siloxane materials are for example ammonium perchlorate and aluminium acetyl acetonate that can open epoxy rings and act as high temperature acids.

The coating compositions can include a variety of other ingredients such as compatible monomers and polymers, coupling agents, stabilizers, antioxidants, flexibilizers, colorants (e.g., dyes and pigments), reinforcing fillers, surfactants, flow aids, levelling agents, hardness enhancers (e.g., colloidal silica), refractive index modifiers (eg titanium dioxide, zirconium dioxide, antimony oxide, etc), antistatic agents, uv absorbers and the like. Additionally, solvents may be utilised to facilitate preparation and application of the compositions.

As also mentioned above, in one form of the method of the present invention, the second coating layer (which in this form may be referred to as a primer coating) may be intended to act as an adhesion promoter between the abrasion resistant coating layer and the lens substrate formed by the polymerisation of the organic material. For specific applications, such a coating will need to be tailored accordingly. For instance, if the coating is to promote adhesion of a polysiloxane hard coat to a lens substrate such as CR-39, the coating may contain at least 30% methacryloxypropyltrimethoxysilane. Comonomers with the methacryloxypropyltrimethoxysilane may include other polysiloxanes, monomers/oligomers with reactive ethylenically unsaturated groups, monomers/oligomers that coreact via condensation, or combinations thereof.

With reference now to the manufacturing process, moulds used in the manufacture of, for example, ophthalmic lenses from organic materials are generally made from glass or metal and typically have first and second mould sections which are mounted in a gasket to form the front and back optical surfaces on the lenses. At least one of these sections has a surface that forms a finished optical surface. Depending upon the particular application, a permanent or semi-permanent treatment may be applied to facilitate mould release.

The coating layers of the method of the present invention may be applied to one or more of the mould surfaces by a variety of techniques including spraying, dipping, brushing, flow coating, spin coating and the like.

If any of the coating compositions include a solvent, the solvent may be, and preferably is, removed prior to the deposition of subsequent layer(s) or prior to the moulds being filled, for reasons as described above. The solvent removal preferably occurs either in concert with a partial curing or as a separate process that is preferentially conducted prior to a partial curing. The solvent removal may be achieved by air drying or by the use of infra-red radiation, microwave radiation or heat, again as has been generally described above.

After the desired level of curing (or solvent removal) for the final coating layer is obtained, the mould is preferably assembled and filled with liquid organic material to provide the lens substrate. A wide variety of thermosetting materials may be employed. In a preferred form, all that is necessary of such materials is that they be capable of solidifying to form a room-temperature stable, optically clear, optical element. Examples of useful thermosetting materials include allyl diglycol carbonate monomer (also known commercially as CR-39), acrylate monomers, and acrylate oligomers, thiourethanes, combinations of multifunctional thiols with acrylates, etc.

Once the mould is filled, the organic liquid may be hardened by any suitable technique. For example, allyl diglycol carbonate may be hardened by subjecting it to heat in the range of 35° C. to 120° C. for up to 24 hours in an oven or in a series of water baths, according to a predetermined schedule in the presence of a suitable polymerisation agent.

As the organic liquid hardens, the coating layer adjacent to the organic liquid, and any subsequent coating layers in direct contact, preferably form an intimate bond providing excellent adhesion. The adhesion between individual coating layers, and with the lens substrate, is preferably such that the structure can survive accelerated weathering, outdoor weathering, and 3 hour boil tests and the like, without the loss of adhesion, excessive crazing, delamination, etc. The loss of adhesion may be as measured by an industry standard tape test, such as a test where a series of cross-hatched regions are formed on a lens surface, a pressure sensitive adhesive tape is applied and the tape is then quickly removed.

Once hardened, the cast ophthalmic lenses are removed from the mould. As the adhesion of the multilayer coatings to the lens substrate is greater than the adhesion to the face of the mould, the ophthalmic lens separates essentially completely from the mould. It is preferable that the adhesion of the first layer to the mould is such that this layer does not separate from the mould during processing, until the mould is opened, to prevent contamination of the mould surface by water, etc during processing.

By using standard ophthalmic industry abrasion tests, the abrasion resistance of ophthalmic lenses produced in accordance with the method of the present invention can be demonstrated. In this respect, it has been found that for such lenses, the haze developed following a Bayer abrasion test was less than ¼ as severe as an uncoated CR-39 lens. The haze developed following a steel wool abrasion test was less than ¹⁄₂₀ as severe as an uncoated CR-39 lens. In comparison, a conventional single layer in-mould coating, with sufficient adhesion to the lens substrate and adequate mould release properties, resulted in haze levels following a Bayer abrasion test of only 1/1.5 to ½ of that for an uncoated CR-39 lens.

DESCRIPTION OF EXAMPLES OF THE INVENTION

Examples of suitable materials for use with the method of the present invention will now be provided, following which examples of the method steps themselves will be provided. In providing these examples, it is to be understood that the specific nature of the following description is not to limit the generality of the above description.

Example 1

Hard Coat Resin 1

To 20 parts of methyltrimethoxysilane, 26 parts of glycidoxypropyltrimethoxysilane and 33 parts methanol, 21 parts of water is added dropwise to effect hydrolysis. The solution was vacuum distilled at 75 C to remove water and liberated methanol. This formed the base resin.

To 76 parts of the above base resin is added 20.8 parts of colloidal silica, 0.4 parts of aluminium acetyl acetonate and 2.8 parts of a 10% solution of ammonium perchlorate in water. This resin is herein referred to as Hard Coat Resin 1.
Primer Coat Resin 1

To 30 parts of methacryloxypropyltrimethoxysilane, 20 parts of glycidoxypropyltrimethoxysilane and 35 parts methanol, 15 parts of water were added dropwise to effect hydrolysis. The solution was vacuum distilled at 75° C. to remove water and liberated methanol.

To 20 parts of the above base resin was added 80 parts of ethyl acetate. This resin is herein referred to as Primer Coat Resin 1.

Hard Coat Resin 1 was flow coated over phenyl trichlorosilane treated glass moulds. The moulds were heated for 6 minutes at 120° C. to affect a partial cure and allowed to cool down. Primer Resin 1 was flow coated over the hard coated moulds. The moulds were heated for 15 minutes at 120° C. to affect a partial cure and allowed to cool down. The moulds were assembled, filled with CR-39 and cured. On completion of the cure, the moulds were opened. The lenses were then post-cured at 120° C. for 2 hours.

Example 2

Hard Coat Resin 2

To 100 parts of PPG 1080 (a commercial hard coat resin), 0.28 parts of aluminium acetyl acetonate and 1.76 parts of a 10% solution of ammonium perchlorate in water were added. This resin is herein referred to as Hard Coat Resin 2.
Primer Coat Resin 2

30 parts of methacryloxypropyltrimethoxy silane, 20 parts of glycidoxypropyltrimethoxysilane and 35 parts methyl isobutyl ketone (MIBK) and 15 parts of a 1M potassium hydroxide solution was combined to form an immiscible solution. The solution was then stirred for 24 hours to develop the molecular weight (after about 1 hour of stirring the mix becomes miscible) and form the base resin.

To 50 parts of the base resin was added 45 parts of MIBK, 5 parts of a 10% solution of glacial acetic acid in MIBK, 0.28 parts of aluminium acetyl acetonate and 1.76 parts of a 10% solution of ammonium perchlorate in water. This resin is herein referred to as Primer Coat Resin 2.

Hard Coat Resin 2 was flow coated over phenyl trichlorosilane treated glass moulds. The moulds were air dried for 5 minutes to evaporate solvent. Primer Resin 2 was flow coated over the hard coated moulds. The moulds were air dried for 5 minutes to evaporate solvent. The moulds were assembled, filled with CR-39 and cured. On completion of the cure, the moulds were opened. The lenses were then post-cured at 120° C. for 2 hours.

Example 3

PPG 1080, without further modification, was flow coated over phenyl trichlorosilane treated glass moulds. The moulds were heated for 6 minutes at 120° C. to effect a partial cure and allowed to cool down. Primer Resin 1 was flow coated over the hard coated moulds. The moulds were heated for 15 minutes at 120° C. to affect a partial cure and allowed to cool down. The moulds were assembled, filled with CR-39 and cured. On completion of the cure, the moulds were opened. The lenses were then post-cured at 120° C. for 2 hours.

Lenses manufactured in accordance with each of the Examples 1 to 3 were then subjected to various adhesion and abrasion resistant tests in accordance with traditional techniques. The results of those tests are tabulated below.

|  | Example 1 | Example 2 | Example 3 |
|---|---|---|---|
| Adhesion | | | |
| Primary | Pass | Pass | Pass |
| 3 hour boil | Pass | Pass | Pass |
| Suntester | Pass | Pass | Pass |
| Outdoor Weathering | Pass | Pass | Pass |
| Abrasion Resistance* | | | |
| Bayer Number | 4.9 | 3.8-4.2 | 4.1 |
| Steel Wool | >20 | >20 | >20 |
| Taber | 17 | 12 | 12 |

*The abrasion resistance numbers are based upon the ratio of haze developed between the coated lenses to the haze developed with uncoated CR-39 lenses.

Finally, it will be appreciated that other variations and modifications may be made to the methods and compositions described herein without departing from the scope of the present invention

The invention claimed is:

1. A method of forming a coated optical element, the method using a mould having first and second mould sections that will form front and back surfaces of the optical element, one of the mould sections having a casting face, the method including the steps of:
   (a) applying an abrasion resistant coating layer to the casting face of a mould section, the casting face being capable of imparting a desired optical configuration on a surface of the optical element;
   (b) treating the abrasion resistant coating layer to prevent damage to the layer during subsequent steps;
   (c) applying a second coating layer to the abrasion resistant coating layer to substantially cover the abrasion resistant coating layer;
   (d) treating the second coating layer to provide at least weak adhesion of the second coating layer to the abrasion resistant coating layer and to prevent damage to the second layer during subsequent steps;
   (e) filling the mould with an organic liquid material; and
   (f) hardening the organic liquid material so as to form the optical element adhered to the second coating layer; wherein the second coating layer is an intermediate coating layer which co-reacts with the organic liquid material and with the abrasion resistant coating layer, thereby forming the coated optical element.

2. A method according to claim 1 wherein the treatment of each coating layer is conducted to a degree wherein the coating layer forms a substantially insoluble dry film that exactly replicates the casting face of the mould in a substantially aberration-free manner.

3. A method according to claim 2 wherein the treatment is an at least partial cure.

4. A method according to claim 3 wherein the at least partial cure is conducted by exposing a coating layer to a temperature in the range of 35° C. to 130° C. for a duration in the range of one to thirty minutes.

5. A method according to claim 4 wherein a coating layer contains an unsaturated monomer, and the coating layer is cured until it exhibits a degree of unsaturation in the range of 30% to 90% of the unsaturation it possessed prior to curing.

6. A method according to claim 4 wherein a coating layer contains an unsaturated monomer, and the coating layer is cured until it exhibits a degree of unsaturation in the range of 55% to 70% of the unsaturation it possessed prior to curing.

7. A method according to claim 3 wherein the curing is initiated by a thermal initiator, or by activating radiation with an appropriate initiator, or by electron beam radiation.

8. A method according to claim 1 wherein the abrasion resistant coating layer is a polysiloxane coating layer, containing partially hydrolysed and partially condensed organosilane that is selected from the group consisting of glycidoxypropyltrimethoxysilane, methyltrimethoxysilane, methacryloxypropyltrimethoxysilane, allyltrimethoxysilane, vinyltrimethoxysilane and other organosilanes, and wherein condensation thereof is further advanced to provide a gelled network.

9. A method according to claim 1 wherein the abrasion resistant coating layer is a polysiloxane coating layer, containing partially hydrolysed and partially condensed functionalized organosilane that is selected from the group consisting of glycidoxypropyltrimethoxysilane, methacryloxypropyltrimethoxysilane, allyltrimethoxysilane, vinyltrimethoxysilane and other functionalised organosilanes, and wherein a gelled network is formed through the polymerization of the organic component of the polysiloxane.

10. A method according to claim 9 wherein network formation via the organic component is effected by (i) ring opening the glycidoxy portion of the glycidoxypropyltrimethoxysilane using cationic initiators or curing catalysts, (ii) curing the ethylenic portion of the methacryloxypropyltrimethoxysilane, vinyltrimethoxysilane or allyltrimethoxysilane, or (iii) by using cationic or free radical initiators.

11. A method according to claim 1 wherein the treatment of at least one of the abrasion resistant coating layer and the second coating layer is the removal of solvent from a coating layer.

12. A method according to claim 1 wherein the method includes the further step of a thermal post-cure cycle after the hardening of the organic liquid material.

13. A method according to claim 12 wherein the thermal post-cure cycle is sufficient to ensure essentially complete curing of the coating layers.

14. A method according to claim 13 wherein one or more of the coating layers are of a polysiloxane, and wherein the thermal post-cure cycle includes heating to a temperature in the range of 90 to 120° C. for a period of up to 4 hours to substantially fully condense the polysiloxane coating layers.

15. A method according to claim 1 wherein the casting face of the mould section is coated with one or more further coating layers(s) prior to applying the abrasion resistant coating layer.

16. A method according to claim 15 wherein the further coating layers are individually selected from the group consisting of: a hydrophobic layer, an oleophobic layer, and an anti-reflection stack of layers.

17. A method according to claim 16 wherein each of the further coating layers has a thickness in the range of 1 nm to 1 μm.

18. A method according to claim 16 wherein each of the further coating layers has a thickness in the range of 1 nm to 30 nm.

19. A method according to claim 1 wherein the optical element is coated with additional coating layers.

20. A method according to claim 19 wherein the subsequent coating layers are selected from the group consisting of: a hydrophobic layer, an oleophobic layer, and an anti-reflection stack of layers.

21. A method according to claim 1 wherein the adhesion of coating layers to a mould surface is assisted by a surface modification of the mould surface, such surface modification being in the form of a silane treatment or a fluorochemical treatment.

22. A method according to claim 1 wherein the adhesion of coating layers to a mould surface is assisted by the addition of mould release agents or adhesion promoters to the coating resin.

23. A method according to claim 1 wherein the abrasion resistant coating layer is formed from a polysiloxane resin and the second coating layer is formed from a (meth)acryl silane.

24. A method according to claim 23 wherein the second coating layer contains an amount of (meth)acryl silane in the range of from 30% to 100% by weight.

25. A method according to claim 23 wherein the second coating layer contains an amount of (meth)acryl silane in the range of from 50% to 90% by weight.

26. A method according to claim 23 wherein the (meth)acryl silane is methacryloxypropyltrimethoxysilane.

27. A method according to claim 1 wherein the abrasion resistant coating layer has a thickness in the range of 0.5 to 50 μm.

28. A method according to claim 27 wherein the thickness of the abrasion resistant coating layer is in the range of 1 μm to 5 μm.

29. A method according to claim 1 wherein the second coating layer acts as an adhesion promoter between the abrasion resistant coating layer and the organic material.

30. A method according to claim 29 wherein the second coating layer has a thickness in the range of 0.05 μm to 50 μm.

31. A method according to claim 29 wherein the second coating layer has a thickness in the range of 0.2 μm to 1 μm.

32. A method according to claim 1 wherein the second coating layer acts as an impact resistant primer layer between the abrasion resistant coating layer and the organic material.

33. A method according to claim 32 wherein the second coating layer is a polyurethane.

34. A method according to claim 32 wherein the second coating layer has a thickness in the range of 0.05 μm to 20 μm.

35. A method according to claim 32 wherein the second coating layer has a thickness in the range of 0.5 μm to 10 μm.

36. A method according to claim 1 wherein an anti-reflection stack of layers is coated over the optical element, the stack cumulatively having a thickness in the range of 0.5 to 20 μm.

37. A method according to claim 36 wherein the stack cumulatively has a thickness in the range of 1.5 to 5 µm.

38. A method according to claim 36 wherein the layers in the stack include alternate high and low refractive index layers.

39. A method according to claim 1 wherein particulate fillers are added to at least one of the abrasion resistant coating layer and the second coating layers to modify the refractive index of the coating layer without changing the chemistry of the coating formulation, the average diameter of particles in the filler being in the range of 10 nm to 80 nm diameter.

40. A process for the manufacture of an ophthalmic lens, the process including as a part thereof a method in accordance with claim 1.

41. A method according to claim 1 wherein the organic liquid material is a thermosetting material.

42. A method according to claim 1 wherein the organic liquid organic material is selected from the group consisting of alkyl diglycol carbonate monomer, acrylate monomers, acrylate oligomers, thiourethanes, and combinations of multifunctional thiols with acrylates.

* * * * *